Patented Aug. 11, 1936

2,050,657

UNITED STATES PATENT OFFICE 2,050,657

PROCESS OF PREPARING 1,4,5,8-NAPTHA-LENE-TETRA-CARBOXYLIC ACID

Heinrich Greune, Frankfort-on-the-Main, Germany, assignor to General Aniline Works, Inc., New York, N. Y., a corporation of Delaware No Drawing. Application December 18, 1934, Serial No. 758,143. In Germany December 22, 1933

4 Claims. (Cl. 260—108)

The present invention relates to a process of preparing 1,4,5,8-naphthalene-tetra-carboxylic acid.

I have found that 1,4,5,8-naphthalene-tetra-carboxylic acid, which is a valuable dyestuff intermediate, may be obtained with a good yield and in great purity by treating at a temperature between room temperature and about 100° C. a pyrenequinone which is free from halogen and is advantageously in a finely divided form, with an alkali and an oxidizing agent, such as, for instance, a hypochlorite. It is surprising that the new process is practicable since it could not be expected that the two rings of the pyrenequinone would be subject to such easy fission. The new process by its simplicity constitutes a valuable technical advance.

The following examples serve to illustrate the invention, but they are not intended to limit it thereto; the parts are by weight:

(1) 50 parts of pyrenequinone obtainable, for instance, by oxidation of pyrene with alkali bichromate in dilute sulfuric acid, are heated for some time, while stirring, in 2000 parts of water with 70 parts of caustic soda solution of 40° Bé. and 700 parts of a sodium hypochlorite solution containing about 15 to 16 percent of available chlorine are then added.

The whole is stirred for some time, purified by filtering with suction and the alkaline filtrate is acidified with dilute hydrochloric acid. The 1,4,5,8-naphthalene-tetra-carboxylic acid separates in the form of very pure nearly colorless crystals.

(2) 50 parts of pyrenequinone as used in the process of example 1 are suspended in 2500 parts of water; 65 parts of caustic potash solution of 40° Bé. and 650 parts of sodium hypochlorite solution containing about 16 percent of available chlorine are added and the whole is heated for some time, while stirring. The solution is purified by filtration and the alkaline filtrate is acidified. Thereby the 1,4,5,8-naphthalene-tetra-carboxylic acid formed separates in great purity and with a good yield.

(3) A suspension is prepared from 450 parts of chloride of lime, 40 parts of caustic lime in 2000 parts of water and 0.1 part of naphthalene. To this emulsion there is added in small portions at 80° C., while vigorously stirring, very finely divided pyrenequinone freshly prepared from 50 parts of pyrene as described in example 1. The whole is then stirred for further ½ to 1 hour at 80° C. until it has become nearly white, whereupon it is filtered with suction, the residue remaining on the filter is mixed with 2000 parts of water and the emulsion obtained is acidified with concentrated hydrochloric acid. The 1,4,5,8-naphthalene-tetra-carboxylic acid which has separated is filtered with suction, washed and dissolved in dilute alkali in order to remove small amounts of impurities. The solution is filtered and the product is precipitated by means of concentrated hydrochloric acid.

The 1,4,5,8-naphthalene-tetra-carboxylic acid is thus obtained in a very pure state with a yield of about 80 percent.

It is of course possible to proceed without isolation of the calcium salts by adding concentrated hydrochloric acid to the suspension of the calcium salts when the oxidation is finished and filtering the tetra-carboxylic acid.

(4) A suspension is prepared from 800 parts of sodium hypochlorite solution containing about 15 percent of available chlorine, 140 parts of caustic soda solution of 40° Bé., 0.1 part of naphthalene and 50 parts of very finely subdivided pyrenequinone obtainable, for instance, by oxidation of very finely subdivided pyrene in sulfuric acid by means of sodium or potassium bichromate. The suspension is stirred for several hours at ordinary temperature and then heated for several hours at 50° C. to 80° C. The sodium salt of the 1,4,5,8-naphthalene-tetra-carboxylic acid which has separated is filtered with suction, dissolved in water, filtered from a small quantity of undissolved matter and then acidified. In this manner a yield of about 80 percent of very pure 1,4,5,8-naphthalene-tetra-carboxylic acid is obtained.

I claim:

1. The process which comprises causing pyrenequinone obtainable by oxidation of pyrene with alkali bichromate in dilute sulfuric acid, to react at a temperature between room temperature and about 100° C. with a hypochlorite of oxidizing action in the presence of an alkali.

2. The process which comprises warming pyrenequinone obtainable by oxidation of pyrene with alkali bichromate in dilute sulfuric acid, while stirring, with caustic soda solution, adding gradually thereto a sodium hypochlorite solution containing about 15 to 16 per cent active chlorine and separating the 1,4,5,8-naphthalene-tetra-carboxylic acid thus formed.

3. The process which comprises gradually adding, while stirring, finely divided pyrenequinone obtainable by oxidation of pyrene with alkali bichromate in dilute sulfuric acid, to an aqueous emulsion of chloride of lime, caustic lime and a small amount of naphthalene at a temperature of about 80° C., continuing stirring the mass at this temperature for about an hour and separating the 1,4,5,8-naphthalene-tetra-carboxylic acid thus formed.

4. The process which comprises stirring at room temperature for some hours an aqueous suspension made from sodium hypochlorite solution containing about 15 per cent active chlorine, caustic soda solution, a small amount of naphthalene and finely divided pyrenequinone obtainable by oxidation of pyrene with alkali bichromate in dilute sulfuric acid, and continuing stirring the mass for some hours at about 50° C. to about 80° C.

HEINRICH GREUNE.